(12) United States Patent
Hodrus et al.

(10) Patent No.: US 8,725,374 B2
(45) Date of Patent: May 13, 2014

(54) METHOD FOR DETERMINING CLUTCH COEFFICIENTS OF FRICTION AND METHOD FOR DETERMINING CLUTCH CONTACT POINTS

(71) Applicant: Schaeffler Technologies AG & Co. KG, Herzogenaurach (DE)

(72) Inventors: Erhard Hodrus, Karlsruhe (DE); Ekkehard Reibold, Lahr (DE); George Goeppert, Hausach (DE); Juergen Eich, Buehl (DE)

(73) Assignee: Schaeffler Technologies AG & Co KG, Herzogenaurach (DE)

( * ) Notice: Subject to any disclaimer, the term of this patent is extended or adjusted under 35 U.S.C. 154(b) by 0 days.

(21) Appl. No.: 13/898,145

(22) Filed: May 20, 2013

(65) Prior Publication Data
US 2013/0253791 A1    Sep. 26, 2013

Related U.S. Application Data

(63) Continuation of application No. PCT/DE2011/001933, filed on Nov. 4, 2011.

(30) Foreign Application Priority Data

Nov. 25, 2010 (DE) .......................... 10 2010 052 586

(51) Int. Cl.
*G06F 17/00* (2006.01)

(52) U.S. Cl.
USPC ................................ 701/67; 701/51

(58) Field of Classification Search
USPC ........ 701/67, 68, 51, 58, 60, 64, 99; 477/166, 477/180, 70, 174
See application file for complete search history.

(56) References Cited

U.S. PATENT DOCUMENTS

| | | | |
|---|---|---|---|
| 7,158,873 B2 * | 1/2007 | Eich et al. | 701/68 |
| 2004/0064232 A1 * | 4/2004 | Eich et al. | 701/68 |
| 2004/0128050 A1 | 7/2004 | Rieger et al. | |

FOREIGN PATENT DOCUMENTS

EP    1491787    * 12/2004    ............. F16D 48/06

* cited by examiner

*Primary Examiner* — Marthe Marc-Coleman
(74) *Attorney, Agent, or Firm* — Simpson & Simpson, PLLC

(57) ABSTRACT

A method wherein the first and second threshold values of the characteristic are a threshold value of the clutch temperature, or of the speed of rotation at the particular input shaft of the clutch, or of the speed of the engine, or of the slip speed at the clutch, or of the clutch torque hysteresis, or of the oil volume flow in a wet clutch, or of the actuator speed or of the actuator position.

19 Claims, 2 Drawing Sheets

METHOD FOR DETERMINING CLUTCH COEFFICIENTS OF FRICTION AND METHOD FOR DETERMINING CLUTCH CONTACT POINTS

CROSS-REFERENCE TO RELATED APPLICATIONS

This patent application is filed under 35 U.S.C. §120 and §365(c) as a continuation of International Patent Application No. PCT/DE2011/001933 filed Nov. 4, 2011, which application claims priority from German Patent Application No. 10 2010 052 586.3 filed Nov. 25, 2010, which applications are incorporated herein by reference in their entireties.

FIELD OF THE INVENTION

The invention relates to a situation-dependent quicker adaptation of the clutch coefficient of friction in a motor vehicle transmission having an automated clutch, in particular, in a dual clutch system.

BACKGROUND OF THE INVENTION

Published German Patent Application No. 10 2008 030 473 A1 discloses a method for determining contact points of a decoupling clutch in the drivetrain of a hybrid vehicle. Published German Patent Application No. 10 2008 027 071 A1 discloses a method for determining coefficients of friction of a decoupling clutch in the drivetrain of a hybrid vehicle.

To adapt the clutch parameters, such as coefficient of friction and contact point position, a known model-based approach like that depicted in FIG. 1 is used. With the aid of model 100, an estimated engine speed and an estimated wheel rotation speed are determined from engine torque 110, which is assumed to be known. In control engineering, this approach is referred to as an observer if errors 140, 150, which are obtained from the comparison of the estimated speeds with measured speeds 120, 130, react on drivetrain model 100 in such a way that errors 140, 150 decay from their initial value exponentially toward zero. The decay performance of the error can be represented by a time constant, and corresponds in the broadest sense to a filtering of the coefficient of friction determined by the observer. Thus, the latter cannot follow the real coefficient of friction of the clutch at an arbitrary speed. On the contrary, the attempt is made to obtain a relatively stable coefficient of friction through compensatory measures. FIG. 1 depicts the powertrain model of the observer with the reduction of the calculated wheel/engine speed error.

With a rapid change in the real coefficient of friction, which cannot be greatly attenuated through a compensatory measure, the coefficient of friction is determined falsely for a certain time interval. If the coefficient of friction in the software is clearly too high in comparison with the real coefficient of friction of the clutch, then the torque delivered by the engine will lead to a rapidly increasing engine speed, which in return results in a great increase in the friction. In the opposite case, the clutch will catch immediately, rendering vibration damping due to slippage at the clutch impossible.

In the case of high friction values—for example greater than 25 kW—it has been found that the coefficient of friction rises slightly at first. This increase was taken into account by friction compensation on the coefficient, but afterward the real coefficient of friction drops off sharply. Since the instant at which the drop occurs varies greatly, this effect cannot be softened by means of a compensatory measure. At the same time, the greatly increased engine speed results in another great energy input, so that the coefficient of friction of the clutch is also unable to increase. This effect can be detected in varyingly severe manifestations in all dual clutch systems.

BRIEF SUMMARY OF THE INVENTION

The object of the present invention is to further improve determination of the time pattern of the real clutch coefficient of friction and of the real clutch contact point.

In terms of process engineering, the object is fulfilled by the method described below.

According to the invention, a method is provided for determining clutch coefficients of friction of an automated clutch, for example, in a dual clutch system in a motor vehicle, using a drivetrain model and a clutch model. At the same time, the invention provides that a short-term coefficient of friction and a long-term coefficient of friction of the clutch are determined by means of adaptation, the short-term coefficient of friction being determined from the instant when a first threshold value of a characteristic is exceeded with an increased speed of adaptation.

In an embodiment, the invention provides that upon falling below a second threshold value of the characteristic, the increase in the adaptation speed is canceled, and the short-term coefficient of friction is reduced to the long-term coefficient of friction in a period of 1 to 20 seconds, preferably in a period of 5 to 10 seconds.

In terms of process engineering, the object is also fulfilled by the method described below.

According to the invention, a method is provided for determining clutch contact points of an automated clutch, for example, in a dual clutch system in a motor vehicle, using a drivetrain model and a clutch model. The invention provides that a short-term contact point value and a long-term contact point value of the clutch are determined by means of adaptation, the short-term contact point value being determined from the instant when a first threshold value of a characteristic is exceeded with an increased speed of adaptation.

In an embodiment, the invention provides that upon falling below a second threshold value of the characteristic the increase in the adaptation speed is canceled and the short-term contact point value is reduced to the long-term contact point value in a period of 1 to 20 seconds, for example, in a period of 5 to 10 seconds.

Additional embodiments of the two object-fulfilling methods named above will be explained below.

In an embodiment, the invention provides that the reduction of the short-term coefficient of friction or of the short-term contact point value occurs in a ramp pattern or decaying exponentially, and/or that the reduction of the adaptation of the short-term coefficient of friction or of the short-term contact point value is superimposed.

In an embodiment, the invention provides that the short-term coefficient of friction or the short-term contact point value is determined upon exceeding the first threshold value by increasing the adaptation speed to 1.5 times to 10 times the value of the adaptation speed prior to exceeding the first threshold value, for example, by increasing it to 2.5 times the value of the adaptation speed prior to exceeding the first threshold value.

In an embodiment, the invention provides that the long-term coefficient of friction or the long-term contact point value is determined upon exceeding the first threshold value by leaving the adaptation speed unchanged, or that the long-term coefficient of friction or the long-term contact point value is determined upon exceeding the first threshold value by reducing the adaptation speed to 0.01 times to 0.6 times the value of the adaptation speed prior to exceeding the first threshold value, for example, by reducing it to 0.4 times the value of the adaptation speed prior to exceeding the first threshold value, or that the long-term coefficient of friction or the long-term contact point value is determined upon exceeding the first threshold value by freezing the long-term coefficient of friction or the long-term contact point value.

Freezing is understood here to mean preserving the value of the long-term coefficient of friction or the long-term contact point value, i.e., leaving them unchanged.

In another embodiment, the invention provides that upon falling below the second threshold value, or alternatively, as soon as the short-term coefficient of friction is reduced to the long-term coefficient of friction or the short-term contact point value is reduced to the long-term contact point value, the reduction of the adaptation speed is canceled.

In another embodiment, the invention provides that the first threshold value is greater than the second threshold value.

In another embodiment, the invention provides that the first and second threshold values of the characteristic are a threshold value of the friction.

In another embodiment, the invention provides that the first threshold value is 15 to 35 kilowatts, preferably 25 kilowatts, and the second threshold value is 4 to 10 kilowatts.

In another embodiment, the invention provides that the first and second threshold values of the characteristic are a threshold value of the clutch temperature, or of the speed of rotation at the particular input shaft of the clutch, or of the speed of the engine, or of the slip speed at the clutch, or of the clutch torque hysteresis, or of the oil volume flow in a wet clutch, or of the actuator speed or of the actuator position.

In another embodiment, the invention provides that the first and second threshold values are equal.

In another embodiment, the invention provides that the first threshold value is smaller than the second threshold value.

In another embodiment, the invention provides that the clutch model always uses the short-term coefficient of friction or the short-term contact point of the clutch.

The methods of the invention have the advantage that they further improve the determination of the time pattern of the real clutch coefficient of friction and of the real clutch contact point, for example, in situations in which compensatory measures are not possible.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The object consists of providing in the software not only one coefficient of friction per clutch, in accordance with the existing art, but now two coefficients of friction per clutch. A dual clutch system has in this sense at least two clutches. The adaptation speed of one of the two clutch coefficients of friction per clutch is increased significantly in all situations in which compensatory measures are not possible. One coefficient of friction in certain situations thus represents a short-term, rapidly changing value, while the other coefficient of friction represents a long-term, slowly changing value.

Figure 1:
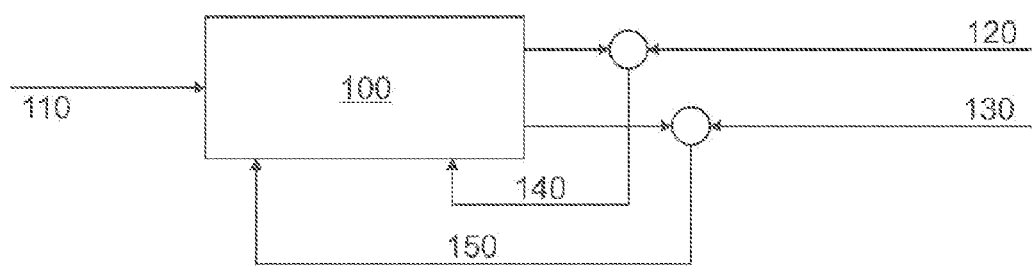
FIG. 1 is a schematic view depicting a known powertrain model of the observer with the reduction of the calculated wheel/engine speed error.
Figure 2:
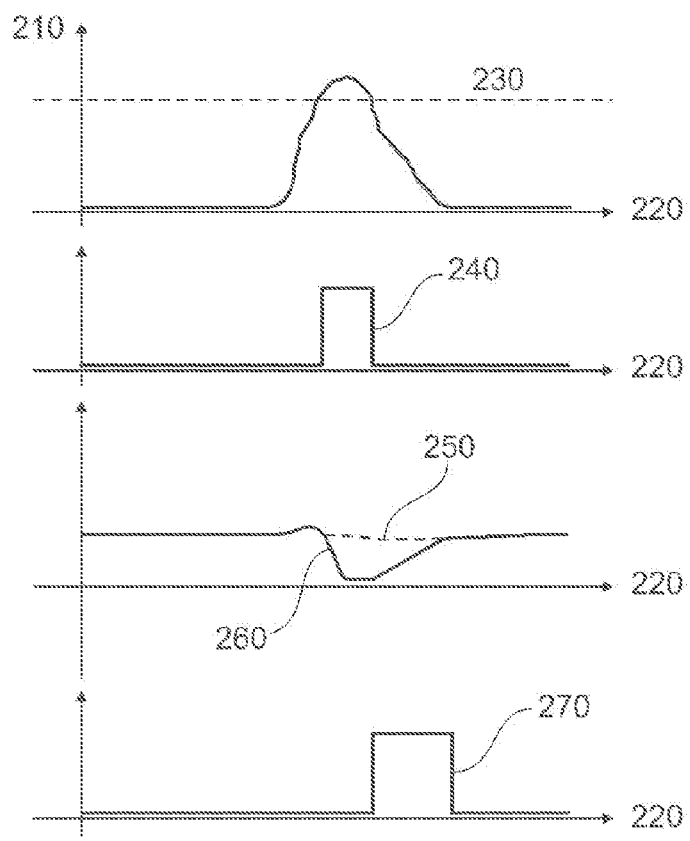
FIG. 2 is a schematic view of signal patterns and depiction of the process of the method of the present invention with regard to the coefficient of friction; and, FIG. 3 is a schematic block diagram of a control system.
Figure 3:
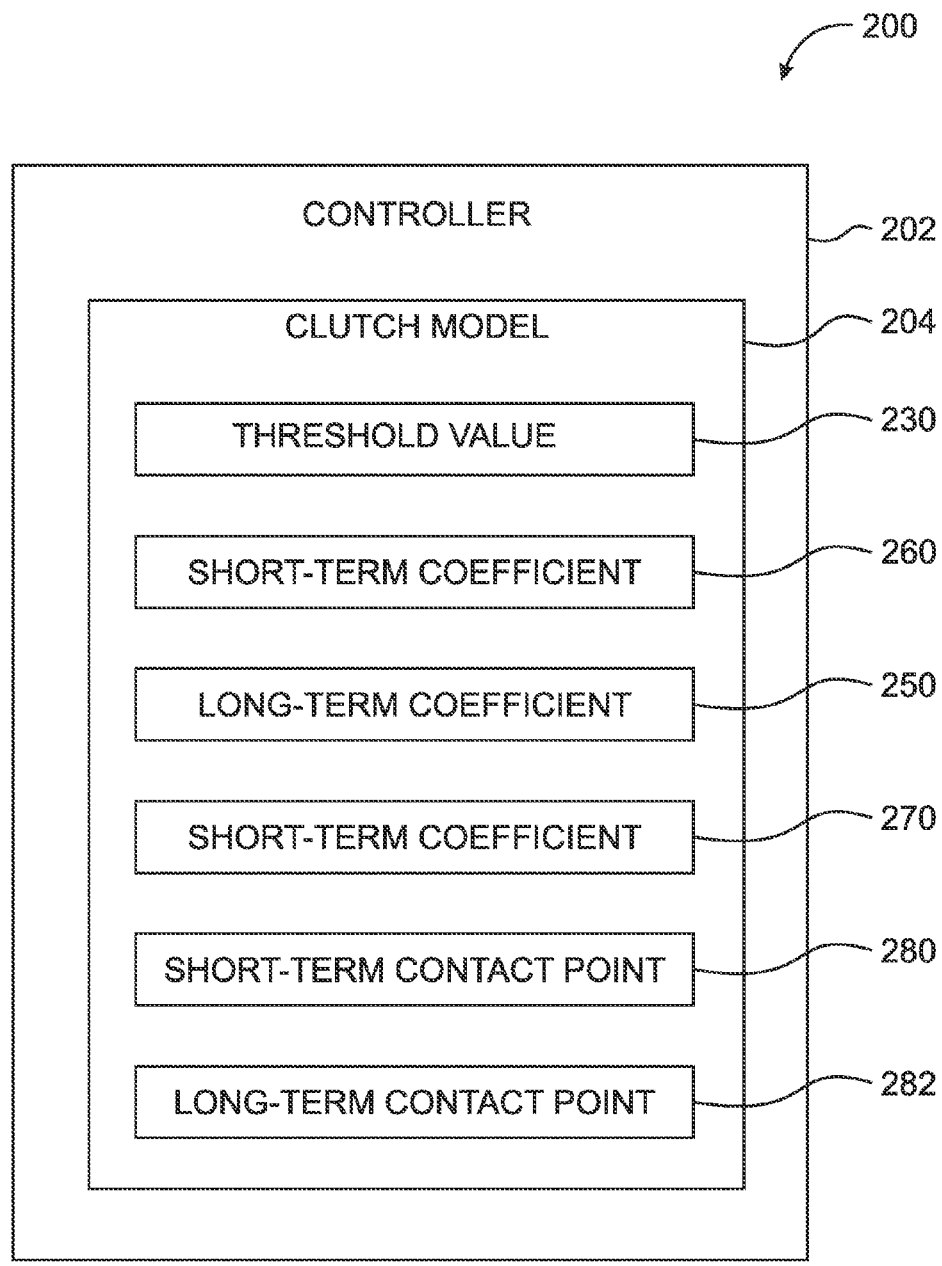

FIG. 2 shows the process sequence of the invention with regard to the coefficient of friction. FIG. 3 is a schematic block diagram of a control system 200 with controller 202 including clutch model 204. If friction 210 is greater than previously defined friction threshold value 230 in model 204, which is, for example, 25 kilowatts, then the adaptation speed of short-term coefficient of friction 260 is significantly increased by controller 202. The adaptation speed of short-term coefficient of friction 260 is increased in this case, for example, to 2.5 times the value prior to the increase. This value is thus in a position to rapidly follow the real coefficient of friction, while up to the moment of exceeding friction threshold value 230 long-term coefficient of friction 250 in model 204 is identical to the short-term coefficient of friction, and in the situation with high friction 240 now changes extremely slowly. Long-term coefficient of friction 250 is frozen as it were at the beginning of situation 240 by controller 202, or is adapted, by controller 202, with reduced speed, and thus serves as a reference to which short-term coefficient of friction 260 must be returned again when the situation is no longer present. It is reduced in this case, for example, to 0.4 times the value prior to the increase. After situation 240 is no longer detected, so that the friction has again sunk below threshold 230, two coefficients of friction 250, 260 are different. The increase in the adaptation speed is canceled by controller 202 again upon leaving situation 240 with a high friction. The short-term coefficient of friction 270 is then returned again, by controller 202, in a ramp pattern to long-term coefficient of friction; this occurs within a period of 5 to 10 seconds. The reduction of the adaptation speed is canceled again upon leaving situation 240 with high friction, or alternatively, no later than as soon as the short-term coefficient of friction is returned again to the long-term coefficient of friction. The clutch model 204 uses the short-term coefficient of friction in all situations.

A general increase in the adaptation speed when using only one coefficient of friction instead of two coefficients of friction, namely the short-term and the long-term coefficient of friction, must be ruled out, as while the later can in fact quickly follow an effect, it is frozen there when the slip is lost. Thus, for the next situation the coefficient of friction can be positioned very incorrectly, since in the situation in which no slip is present, and hence there is no possibility of adaptation, the coefficient of friction of the clutch can, unnoticed, as it were, change considerably.

Alternative Thresholds for Situation Detection for Friction:

As an alternative to a threshold for the power input, it is also possible to work with two different thresholds. In this case, the threshold for detecting the situation is located higher as a rule, for example, at 25 kilowatts, than the threshold for ending the situation with high friction, which is located, for example, at 4 to 10 kilowatts. The opposite case can also be advantageous.

Alternative Reduction Strategies for the Short-Term to the Long-Term Coefficient of Friction:

As an alternative to the ramp-shaped reduction, in which a fixed step-width is added to or subtracted from the short-term coefficient of friction until the two coefficients of friction again agree, an exponential decay behavior may also be used. The reduction may also be superimposed on an adaptation of the short-term coefficient of friction.

Alternative Trigger Signals:

Instead of activating the mechanism with short-term and long-term coefficients of friction only when friction is high, previously defined thresholds can also be used with other signals to release a situation trigger. These possible signals include the clutch temperature, the speed at the input shaft under observation, the speed of the engine, slip speed at the clutch, clutch torque hysteresis, oil volume flows in wet clutches, the actuator speed and the actuator position.

Alternative Adaptation Signals:

Instead of adapting only the clutch coefficient of friction more rapidly depending on the situation, the mechanism for short-term and long-term variables may also be applied to other adaptive parameters, such as the clutch contact point, for example. For example, if friction 210 is greater than previously defined friction threshold value 230 in model 204, which is, for example, 25 kilowatts, then the adaptation speed of short-term contact point 280 is significantly increased by controller 202. The adaptation speed of short-term contact point 280 is increased in this case, for example, to 2.5 times the value prior to the increase. This value is thus in a position to rapidly follow the real coefficient of friction, while up to the moment of exceeding friction threshold value 230 long-term contact point 282 in model 204 is identical to short-term contact point 280.

In an embodiment of the invention, it is thus proposed, instead of only one coefficient of friction per clutch, to use a short-term and a long-term coefficient of friction for each clutch. In cases of high frictional influences, the adaptation speed of the short-term coefficient of friction is greatly increased, while the long-term coefficient of friction serves as a reference and is saved at the beginning of the situation. After the situation, the short-term, rapidly changeable coefficient of friction is intentionally returned to this slowly changeable long-term coefficient of friction.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

100 drivetrain model of the observer
110 engine torque
120 engine speed
130 wheel rotation speed
140 engine speed error
150 wheel rotation speed error
210 friction
220 time
230 friction threshold
240 situation with high friction
250 long-term coefficient of friction
260 short-term coefficient of friction
270 situation of coefficient of friction reduction

What is claimed is:

1. A method for determining clutch coefficients of friction of an automated clutch in a dual clutch system in a motor vehicle, having a powertrain model as well as a clutch model, comprising:
    adapting, using a controller for the motor vehicle, a short-term coefficient and a long-term coefficient of friction for the automated clutch at first and second speeds of adaptation, respectively, the first and second speeds of adaptation substantially the same;
    determining, using the controller, that friction for a clutch has increased beyond a first threshold;
    increasing the second speed of adaptation at a first rate; and,
    increasing the first speed of adaptation at a second rate greater than the first rate.

2. The method as recited in claim 1, further comprising: upon falling below a second threshold value of the characteristic, cancelling, using the controller, the increase in the adaptation speed, and, reducing, using the controller, the short-term coefficient of friction to the long-term coefficient of friction in a period of 5 to 10 seconds.

3. The method as recited in claim 2, wherein reducing the short-term coefficient of friction or of the short-term contact point value includes:
    reducing the short-term coefficient of friction or of the short-term contact point value occurs in a ramp pattern or decaying exponentially; or
    superimposing the reduction of the adaptation of the short-term coefficient of friction or of the short-term contact point value.

4. The method as recited in claim 2, further comprising: cancelling, using the controller, the reduction of the adaptation speed:
    upon falling below the second threshold value; or
    as soon as the short-term coefficient of friction is reduced to the long-term coefficient of friction; or
    as soon as the short-term contact point value is reduced to the long-term contact point value.

5. The method as recited in claim 1, further comprising:
    determining, using the controller, the short-term coefficient of friction or the short-term contact point value upon exceeding the first threshold value by increasing the adaptation speed to 2.5 times the value of the adaptation speed prior to exceeding the first threshold value.

6. The method as recited in claim 1, further comprising:
    determining, using the controller, the long-term coefficient of friction or the long-term contact point value:
        upon exceeding the first threshold value by leaving the adaptation speed unchanged; or
        upon exceeding the first threshold value by reducing the adaptation speed to 0.4 times the value of the adaptation speed prior to exceeding the first threshold value; or;

upon exceeding the first threshold value by freezing the long-term coefficient of friction or the long-term contact point value.

7. The method as recited in claim 6, further comprising:
cancelling, using the controller, the reduction of the adaptation speed:
  upon falling below the second threshold value; or
  as soon as the short-term coefficient of friction is reduced to the long-term coefficient of friction; or
  as soon as the short-term contact point value is reduced to the long-term contact point value.

8. The method as recited in claim 1, wherein the first and second threshold values of the characteristic are a threshold value of the friction, the first threshold value being 25 kilowatts, and the second threshold value being 4 to 10 kilowatts.

9. The method as recited in claim 1, wherein the first and second threshold values of the characteristic are a threshold value:
  of the clutch temperature; or
  of the speed of rotation at the particular input shaft of the clutch; or
  of the speed of the engine; or
  of the slip speed at the clutch; or
  of the clutch torque hysteresis; or
  of the oil volume flow in a wet clutch; or
  of the actuator speed; or
  of the actuator position.

10. A method for determining clutch contact points of an automated clutch in a dual clutch system in a motor vehicle, comprising:
  adapting, using a controller for the motor vehicle, a short-term contact point and a long-term contact point for the automated clutch at first and second speeds of adaptation, respectively, the first and second speeds of adaptation substantially the same;
  determining, using the controller, that friction for a clutch has increases beyond a first threshold;
  increasing the second speed of adaptation at a first rate; and,
  increasing the first speed of adaptation at a second rate greater than the first rate.

11. The method as recited in claim 10, further comprising:
upon falling below a second threshold value of the characteristic, cancelling, using the controller, the increase in the adaptation speed, and, reducing, using the controller, the short-term contact point value to the long-term contact point value in a period of 1 to 20 seconds.

12. The method as recited in claim 11, wherein reducing the short-term coefficient of friction or of the short-term contact point value includes:
  reducing the short-term coefficient of friction or of the short-term contact point value in a ramp pattern or decaying exponentially; or
  superimposing the reduction of the adaptation of the short-term coefficient of friction or of the short-term contact point value.

13. The method as recited in claim 11, further comprising:
cancelling, using the controller, the reduction of the adaptation speed:
  upon falling below the second threshold value;
  or as soon as the short-term coefficient of friction is reduced to the long-term coefficient of friction; or
  as soon as the short-term contact point value is reduced to the long-term contact point value.

14. The method as recited in claim 10, further comprising:
determining, using the controller, the short-term coefficient of friction or the short-term contact point value upon exceeding the first threshold value by increasing the adaptation speed to 1.5 times to 10 times the value of the adaptation speed prior to exceeding the first threshold value.

15. The method as recited in claim 10, further comprising:
determining, using the controller, the long-term coefficient of friction or the long-term contact point value upon:
  exceeding the first threshold value by leaving the adaptation speed unchanged; or
  upon exceeding the first threshold value by reducing the adaptation speed to 0.01 times to 0.6 times the value of the adaptation speed prior to exceeding the first threshold value, or;
  upon exceeding the first threshold value by freezing the long-term coefficient of friction or the long-term contact point value.

16. The method as recited in claim 15, further comprising:
cancelling, using the controller, the reduction of the adaptation speed:
  upon falling below the second threshold value; or
  as soon as the short-term coefficient of friction is reduced to the long-term coefficient of friction; or
  as soon as the short-term contact point value is reduced to the long-term contact point value.

17. The method as recited in claim 10, wherein the first and second threshold values of the characteristic are a threshold value of the friction, the first threshold value being 15 to 35 kilowatts and the second threshold value being 4 to 10 kilowatts.

18. The method as recited in claim 10, wherein the first and second threshold values of the characteristic are a threshold value:
  of the clutch temperature; or
  of the speed of rotation at the particular input shaft of the clutch; or
  of the speed of the engine; or
  of the slip speed at the clutch; or
  of the clutch torque hysteresis; or
  of the oil volume flow in a wet clutch; or
  of the actuator speed; or
  of the actuator position.

19. A method for determining clutch coefficients of friction of an automated clutch in a dual clutch system in a motor vehicle, having a powertrain model as well as a clutch model, comprising:
  adapting, using a controller for the motor vehicle, a short-term coefficient and a long-term coefficient of friction for the automated clutch at first and second speeds of adaptation, respectively, the first and second speeds of adaptation substantially the same;
  determining, using the controller, that a characteristic selected from the group consisting of a temperature of the automated clutch, a speed of rotation at a particular input shaft of the automated clutch, a speed of an engine for the motor vehicle, a slip speed at the automated clutch, torque hysteresis of the automated clutch, oil volume in a wet automated clutch, and a speed an actuator for the automated clutch, and a position of an actuator for the automated clutch, has increases beyond a first threshold;
  increasing the second speed of adaptation at a first rate; and,
  increasing the first speed of adaptation at a second rate greater than the first rate.

* * * * *